(12) United States Patent
Kelty et al.

(10) Patent No.: US 9,910,231 B2
(45) Date of Patent: Mar. 6, 2018

(54) STACKED CAGE OPTICAL MODULE HEAT RELAY SYSTEM

(71) Applicant: Infinera Corp., Annapolis Junction, MD (US)

(72) Inventors: Matthew James Kelty, Cambria, CA (US); Thomas George Macall, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/987,142

(22) Filed: Jan. 4, 2016

(65) Prior Publication Data

US 2017/0192185 A1    Jul. 6, 2017

(51) Int. Cl.
*G02B 6/42* (2006.01)
*H04B 10/80* (2013.01)

(52) U.S. Cl.
CPC .......... *G02B 6/4269* (2013.01); *H04B 10/801* (2013.01)

(58) Field of Classification Search
CPC .................................................... G02B 6/4269
See application file for complete search history.

(56) References Cited

U.S. PATENT DOCUMENTS

| | | | | |
|---|---|---|---|---|
| 5,473,506 A * | 12/1995 | Kikinis | ................ | G06F 1/1626 361/688 |
| 5,768,104 A * | 6/1998 | Salmonson | ........ | H05K 7/20454 257/714 |
| 6,349,035 B1 * | 2/2002 | Koenen | ............... | H01L 23/4093 257/727 |
| 6,882,533 B2 * | 4/2005 | Bash | .................. | H05K 7/20636 165/185 |
| 7,800,910 B2 * | 9/2010 | Seynaeve | ............ | B60R 16/0239 165/185 |
| 8,000,103 B2 * | 8/2011 | Lipp | ................... | F28D 1/05316 165/104.33 |
| 9,246,280 B2 * | 1/2016 | Neer | ..................... | G02B 6/4246 |
| 2012/0113586 A1 * | 5/2012 | Rau | ........................... | G06F 1/20 361/679.47 |
| 2013/0114211 A1 * | 5/2013 | Regnier | ............. | H05K 7/20509 361/704 |
| 2013/0208421 A1 * | 8/2013 | Chester | ............. | H05K 7/20772 361/699 |
| 2016/0197424 A1 * | 7/2016 | L'Esperance | ........ | H01R 12/721 439/61 |

* cited by examiner

*Primary Examiner* — Daniel Petkovsek
(74) *Attorney, Agent, or Firm* — Dunlap Codding P.C.; David L. Stoltz

(57) ABSTRACT

An apparatus comprising a cage for pluggable optical modules including a bay having a first port stacked with a second port, the bay having an opening between the first and second port; a heat collector module in the opening comprising a first contact plate adjacent to the first port bottom and provided in the first port and configured to contact a first optical module in the first port, a second contact plate adjacent to the second port top and provided in the second port and configured to contact a second optical module insertable in the second port, a cold plate between the first and second contact plates, compressible thermal material layers between the contact plates and the cold plate; and a heat pipe having a first portion in thermal contact with the cold plate and a second portion extending beyond the stacked cage and in thermal contact with a radiator.

17 Claims, 5 Drawing Sheets

STACKED CAGE OPTICAL MODULE HEAT RELAY SYSTEM

FIELD OF THE DISCLOSURE

The disclosure generally relates to a heat relay system for pluggable telecommunication module housing assemblies. More particularly, but not by way of limitation, the inventive concepts disclosed herein relate to heat relay systems for stacked cage modules.

BACKGROUND

Circuit packs including pluggable module housings are deployed in various communication networks and are configured to allow for the hot insertion of a variety of pluggable modules, such as transceivers, optical modules, XFP modules, SFP+ modules, QSFP modules, QSFP+ modules, or CFP modules, for example. Components that allow for hot insertion and hot removal are known as "hot-swappable." Hot-swappable components are inserted and/or removed in the field without disassembling the host system, for example, while the host system is in use and/or without interrupting electrical power.

Pluggable modules are generally plugged in or inserted into a pluggable module housing (also known as a "cage") by sliding or otherwise inserting the module into the housing. The cage has multiple ports for insertion of the pluggable modules. The ports are located on top of one another, as "stacks." Such a cage is referred to as a "stacked cage." The ports are also located adjacent to one another, as "gangs." Such a cage is referred to as a "ganged cage." The stacks are adjacent to additional stacks of ports. A cage with adjacent stacks is referred to as a "ganged and stacked cage." The cage is typically attached to a host circuit board.

In such a configuration, it is difficult to disperse the heat produced by a pluggable module inserted in a port. Modules in ports located below other ports and next to the circuit board have even further reduced heat dispersal. If the heat is not dispersed, the module may reach a temperature at which the module fails to function properly, or ceases functioning all together.

Therefore, there exists a need for a system to disperse heat from stacked, ganged, and ganged and stacked cage modules. It is to such systems that the inventive concepts disclosed herein are related.

SUMMARY

In one aspect of the present disclosure, heat relay systems are configured to transfer heat out of telecommunication module cages. In one aspect of the present disclosure, stacked cage optical module heat relay systems are configured to transfer heat from telecommunication modules in a stacked cage for dispersal outside of the stacked cage.

BRIEF DESCRIPTION OF THE DRAWINGS

Certain embodiments of the inventive concepts will hereafter be described with reference to the accompanying drawings, wherein like reference numerals denote like elements. It should be understood, however, that the accompanying figures illustrate the various implementations described herein and are not meant to limit the scope of the various technologies described herein.

DETAILED DESCRIPTION

Figure 1:
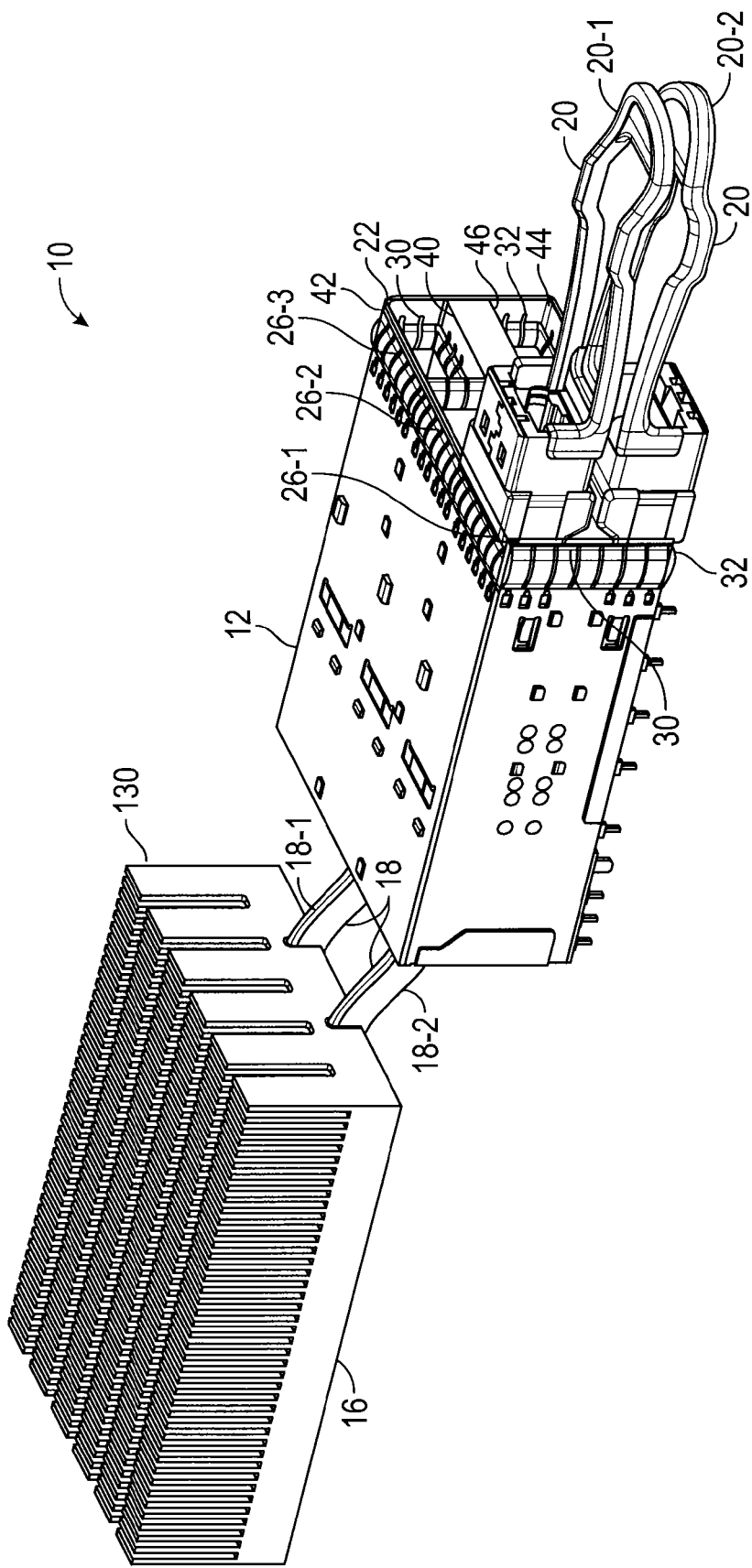
FIG. 1 is a top front perspective view of a stacked cage optical module heat relay system and optical modules constructed in accordance with the inventive concepts disclosed herein.

The following detailed description refers to the accompanying drawings. The same reference numbers in different drawings may identify the same or similar elements.

Conventionally, telecommunication module cages have had poor heat dispersal methods out of the cage. Some cages have used vents in the front of the cage and/or openings between stacked optical modules for heat dispersal. However, such venting is inadequate for heat dispersal and is dependent on directional air flow through the venting. The mechanisms proposed in this disclosure circumvent the problems described above.

Consistent with an aspect of the present disclosure, an apparatus comprises a cage having a front and a back, and a bay comprising a first port stacked with a second port. The bay has an opening between the first port and the second port, the first port having a first port bottom and the second port having a second port top. The apparatus further has a heat collector module positioned in the opening, the heat collector module comprising a first contact plate adjacent to the first port bottom and provided in the first port, the first contact plate being configured to contact an exterior of a first optical module pluggable in the first port; a second contact plate adjacent to the second port top and provided in the second port, the second contact plate being configured to contact an exterior of a second optical module insertable in the second port; a cold plate in between the first contact plate and the second contact plate, the cold plate comprising thermally conductive material; a first compressible thermal material layer in between and in contact with the first contact plate and the cold plate; and a second compressible thermal material layer in between and in contact with the cold plate and the second contact plate. The apparatus further comprises a heat pipe having a substantially rectangular cross section, a first portion of the heat pipe being in thermal contact with the cold plate, and a second portion of the heat pipe extending beyond the cage; and a radiator in thermal contact with the second portion of the heat pipe.

Consistent with an aspect of the present disclosure, an apparatus comprises a cage having a front and a back, and a plurality of bays, each bay comprising a first port stacked with a second port, each bay having an opening between the first port and the second port, the first port having a first port bottom and the second port having a second port top. The apparatus further comprises a heat collector module positioned in each opening, the heat collector module comprising a first contact plate adjacent to the first port bottom and provided in the first port, the first contact plate being configured to contact an exterior of a first optical module pluggable in the first port; a second contact plate adjacent to the second port top and provided in the second port, the second contact plate being configured to contact an exterior of a second optical module insertable in the second port; a cold plate in between the first contact plate and the second contact plate, the cold plate comprising thermally conductive material; a first compressible thermal material layer in between and in contact with the first contact plate and the cold plate; and a second compressible thermal material layer in between and in contact with the cold plate and the second contact plate. The apparatus further comprises a plurality of heat pipes each having a substantially rectangular cross section, a first portion of each of the heat pipes being in thermal contact with at least one cold plate, and a second portion of each of the heat pipes extending beyond the cage; and a radiator in thermal contact with the second portions of the heat pipes.

Definitions

If used throughout the description and the drawings, the following short terms have the following meanings unless otherwise stated:

SFP stands for Small Form-factor Pluggable. An SFP module is generally a transceiver for use in telecommunication and data communication applications to interface networking hardware to a fiber optic cable or active or passive electrical copper connection. SFP is a communication industry format.

SFP+ stands for Enhanced Small Form-factor Pluggable. SFP+ is an enhanced version of SFP that supports data rates up to 16 Gbit/s.

QSFP stands for Quad Small Form-factor Pluggable. A QSFP module is generally a transceiver for use in telecommunication and data communication applications to interface networking hardware to a fiber optic cable or active or passive electrical copper connection. QSFP is a communication industry format. QSFP typically provides three times the density of SFP or SFP+ modules.

QSFP+ stands for Enhanced Quad Small Form-factor Pluggable. QSFP+ is an enhanced version of QSFP.

DESCRIPTION

Specific embodiments of the inventive concepts disclosed herein will now be described in detail with reference to the accompanying drawings. Further, in the following detailed description of embodiments of the present disclosure, numerous specific details are set forth in order to provide a more thorough understanding of the disclosure. However, it will be apparent to one of ordinary skill in the art that the embodiments disclosed herein may be practiced without these specific details. In other instances, well-known features have not been described in detail to avoid unnecessarily complicating the description.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited or inherently present therein.

As used herein any references to "one embodiment," "an embodiment," or "some embodiments" means that a particular element, feature, structure, or characteristic described in connection with the embodiment is included in at least one embodiment. The appearances of the phrase "in one embodiment" in various places in the specification may not refer to the same embodiment.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

It is noted that the terms "top," "bottom," "side," "front," and "rear," as used herein, are for ease of description, and are not intended to limit the orientation of components or the scope of the invention. One of skill in the art will readily appreciate that the physical orientation of an optical-electrical device, such as a pluggable telecommunication module, may be positioned in any orientation Referring now to the drawings, and in particular to FIGS. 1-5, shown therein is a stacked cage optical module heat relay system 10 constructed in accordance with the present disclosure. In general, the stacked cage optical module heat relay system 10 comprises a cage 12, at least one heat collector module 14 positioned in the cage 12, a radiator 16 positioned outside of the cage 12, and at least one heat pipe 18 in thermal contact with the heat collector module 14 and the radiator 16 for conveying heat from the heat collector module 14 to the radiator 16.

In the example shown, the cage 12 is a stacked and ganged cage for pluggable optical modules 20, although the cage 12 can be a stacked cage, or a ganged cage. The cage 12 has a front 22 and a back 24 and at least one bay 26 comprising at least a first port 30 stacked with a second port 32. The pluggable optical modules 20 may be inserted into and removed from the first port 30 and the second port 32. Nonexclusive examples of pluggable optical modules 20 include SFP modules, SFP+ modules, QSFP modules, and QSFP+ modules.

The cage 12 may have electrical connector (not shown) disposed at a rear of the first port 30 and the second port 32. The connectors and the cage 12 are electrically and mechanically connected to a circuit board (not shown), such that when the pluggable optical module 20 is plugged into the first port 30 or the second port 32, the optical module 20 is electrically and mechanically connected to the first port 30 or the second port 32 and the circuit board. The first port 30 and the second port 32 may be sized to matingly engage the optical modules 20.

The exemplary cage 12 shown in FIGS. 1-4 is a ganged and stacked cage 12 having a first bay 26-1, a second bay 26-2, and a third bay 26-3, each of the first bay 26-1, the second bay 26-1, and the third bay 26-3 comprising a first port 30 stacked with a second port 32, for explanatory purposes. However, it will be understood that the cage 12 may have one, two, three, four, five, six, or more of the bays 26, and that the bays 26 may have more than two stacked ports.

Figure 3:
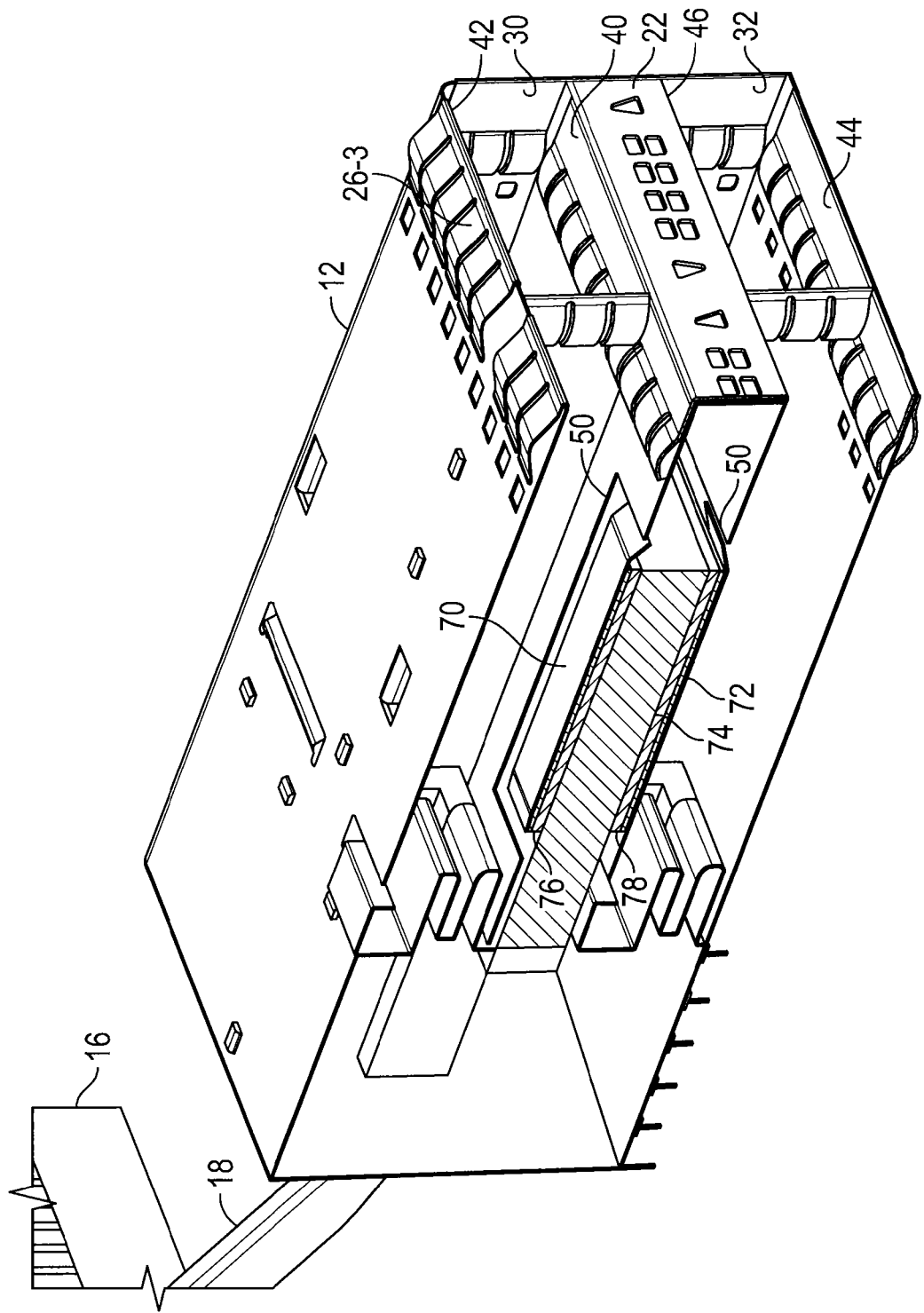
FIG. 3 is a cross-sectional view of a portion of the system of FIG. 1.
Figure 4:
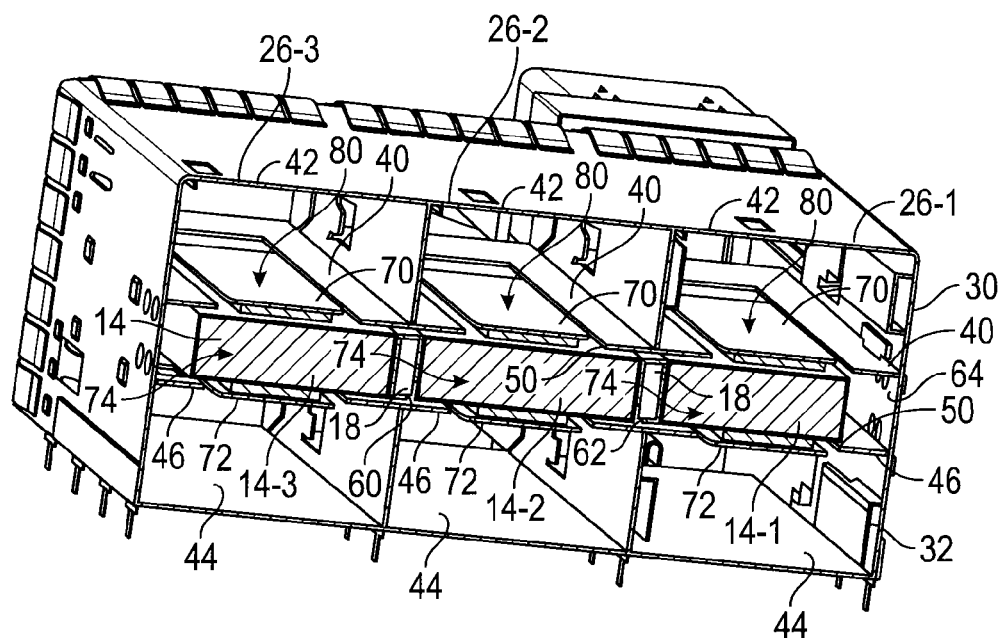
FIG. 4 is another cross-sectional view of a portion of the system of FIG. 1 without the optical modules.

As illustrated in FIGS. 3 and 4, in each of the first bay 26-1, the second bay 26-2, and the third bay 26-3, the first port 30 has a first port bottom 40 and first port top 42. The second port 32 has a second port bottom 44 and a second port top 46. Each of the first bay 26-1, the second bay 26-2, and the third bay 26-3 has an opening 50 between the first port 30 and the second port 32. In one aspect of the present disclosure, the size of the opening 50 between the first port 30 and the second port 32 may be maximized within the limitations of the size and structural integrity of the cage 12.

In one aspect of the present disclosure, the opening 50 has a center substantially aligned with a heat source of the pluggable optical modules 20.

In one aspect of the present disclosure, the cage 12 has a first bay opening 60 between the first bay 26-1 and the second bay 26-2, and a second bay opening 62 between the second bay 26-2 and the third bay 26-3. The first and second bay openings 60, 62 connect the openings 50 between the first ports 30 and the second ports 32 in the cage 12. In one aspect of the present disclosure, the first and second bay openings 60, 62 and the openings 50 between the first ports 30 and the second ports 32 create a contiguous heat transfer opening 64.

The heat collector module 14 is positioned in and substantially conforms to upper and lower boundaries of the opening 50 between the first port 30 and the second port 32 in the cage 12. As shown in FIGS. 4-7, by way of example, a first heat collector module 14-1 is positioned in the opening 50 between the first port 30 and the second port 32 of the first bay 26-1, a second heat collector module 14-2 is positioned in the opening 50 between the first port 30 and the second port 32 of the second bay 26-2, and a third heat collector module 14-2 is positioned in the opening 50 between the first port 30 and the second port 32 of the third bay 26-3. Again, it will be understood that there may be a larger number or smaller number of bays 26 and heat collector modules 14.

Figure 6:
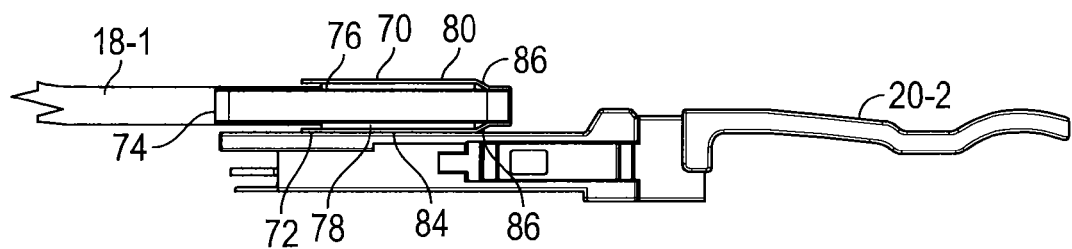
FIG. 6 is a side view of the heat collector module of the stacked cage optical module heat relay system positioned on an optical module in accordance with the inventive concepts disclosed herein.

As shown in FIG. 6, each of the heat collector modules 14 has a first contact plate 70, a second contact plate 72, a cold plate 74 between the first contact plate 70 and the second contact plate 72, a first compressible thermal material layer 76 in between and in contact with the first contact plate 70 and the second contact plate 72, and a second compressible thermal material layer 78 in between and in contact with the cold plate 74 and the second contact plate 72.

The first contact plate 70 is adjacent to the first port bottom 40 and in the first port 30. The first contact plate 70 is configured and positioned to contact an exterior of a first optical module 20-1 pluggable in the first port 30. For example, the first contact plate 70 may have a contact surface 80 that protrudes into the first port 30. In the example shown, the contact surface 80 is configured to matingly engage the exterior of the first optical module 20-1. For example, when the exterior of the first optical module 20-1 has a substantially flat surface, the contact surface 80 may be substantially flat, as heat transfer is improved between components with greater contact between the components. In the example shown, the contact surface 80 of the first contact plate 70 is in thermal contact with the exterior of the first optical module 20 when the first optical module 20 is removably engaged in the first port 30.

The second contact plate 72 is adjacent to the second port top 46 and in the second port 32. The second contact plate 72 is configured to contact an exterior of a second optical module 20-2 insertable in the second port 32. For example, the second contact plate 72 may have a contact surface 84 that protrudes into the second port 32. In this example, the contact surface 84 is configured to matingly engage the exterior of the first optical module 20-1. For example, when the exterior of the first optical module 20-1 has a substantially flat surface, the contact surface 84 may be substantially flat, as heat transfer is improved between components with greater contact between the components. The contact surface 84 of the second contact plate 72 may be in thermal contact with the exterior of the second optical module 20-2.

In one aspect of the present disclosure, the size of the first and second contact surfaces 80, 84 of the first and second contact plates 70, 72 is substantially the size of the openings 50 between the first ports 30 and the second ports 32. Heat transfer is increased with an increase in the area of contact between the first and second contact surfaces 80, 84 and the exteriors of the optical modules 20-1, 20-2.

The first and second contact plates 70, 72 are made, at least in part, of thermally conductive material or combinations of materials. The first and second contact plates 70, 72 may be made of copper, aluminum, and/or other thermally conductive material or combinations of thermally conductive material. In one aspect of the present disclosure, the first and second contact plates 70, 72 may be made of aluminum 6063 having a conductivity (k) of approximately 210 W/(m*K).

In one aspect of the present disclosure, the first and second contact plates 70, 72 may be nickel plated. Nickel plating may improve heat transfer between surfaces as the nickel plating may increase the flatness of the surfaces, thereby decreasing air gaps between the surfaces and lowering thermal resistance.

Figure 5:
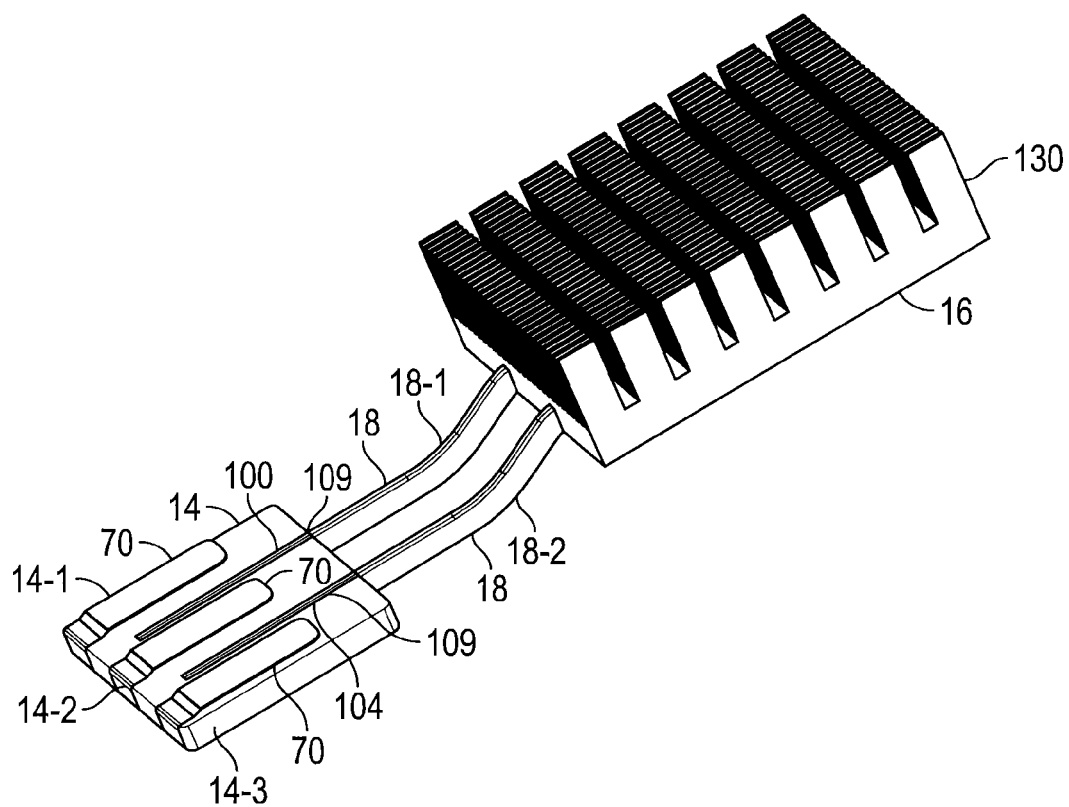
FIG. 5 is a perspective view of a heat collector module, a radiator, and two heat pipes of the stacked cage optical module heat relay system constructed in accordance with the inventive concepts disclosed herein.

As shown in FIGS. 5 and 6, in one aspect of the present disclosure, the first and second contact plates 70, 72 are formed of a single piece of material that is shaped to wrap around the edge of the cold plate 74. Thus, the first and second contact plates 70, 72 are connected.

In one aspect of the present disclosure, the first and second contact plates 70, 72 each have a front portion 86 that is angled toward the cold plate 74 for guiding the insertion of the optical modules 20-1 into the first port 30 and/or second port 32 of the bay 26 of the cage 12. In one aspect of the present disclosure, the front portions 86 of the first and second contact plates 70, 72 are connected as discussed above.

The cold plate 74 of the heat collector module 14 is positioned in between, and in thermal contact with, the first contact plate 70 and the second contact plate 72. The cold plate 74 is made of thermally conductive material or combinations of thermally conductive material. Nonexclusive examples of material of the cold plate 74 include copper, aluminum, and/or other thermally conductive material. In one aspect of the present disclosure, the cold plate 74 may be made of aluminum 6063 having a conductivity (k) of approximately 210 W/(m*K).

The cold plate 74 may be nickel plated. Nickel plating may improve heat transfer between surfaces as the nickel plating may increase the flatness of the surfaces, thereby decreasing air gaps between the surfaces and lowering thermal resistance.

As shown in FIGS. 5 and 6, in one aspect of the present disclosure, the cold plates 74 from two or more heat collector modules 14 may be connected. In one aspect of the present disclosure, the cold plates 74 from two or more heat collector modules 14 may be formed of one unit in the heat transfer opening 64 of the cage 12. In this example, the one unit can include slots to receive the first and second heat pipes 18-1, 18-2.

In one aspect of the present disclosure, the first compressible thermal material layer 76 in between and in contact with the first contact plate 70 and the cold plate 74 has an expanded condition and a compressed condition. In the absence of the optical module 20 in the first port 30, the first compressible thermal material layer 76 is in the expanded condition. When the first optical module 20-1 is inserted in the first port 30, the first optical module 20-1 exerts force on the first contact plate 70, which compresses the first compressible thermal material layer 76 into the compressed condition. In the compressed condition, the first compressible thermal material layer 76 exerts force against the first contact plate 70 such that the first contact plate 70 is biased against and in contact with the exterior of the first optical module 20-1. When the first optical module 20-1 is removed from the first port 30, the first compressible thermal material layer 76 returns to the expanded condition.

Likewise, in one aspect of the present disclosure, the second compressible thermal material layer 78 in between and in contact with the cold plate 74 and the second contact plate 72 has an expanded condition and a compressed condition. In the absence of the optical module 20 in the second port 32, the second compressible thermal material layer 78 is in the expanded condition. When the second optical module 20-2 is inserted in the second port 32, the second optical module 20-2 exerts force on the second contact plate 72, which compresses the second compressible thermal material 78 layer into the compressed condition. In the compressed condition, the second compressible thermal material layer 78 exerts force against the second contact plate 72 such that the second contact plate 72 is biased against and in contact with the exterior of the second optical module 20-2. When the second optical module 20-2 is removed from the second port 32, the second compressible thermal material layer 78 returns to the expanded condition.

In one aspect of the present disclosure, the first compressible thermal material layer 76 may be attached to the first contact plate 70 and the cold plate 74 with a bonding material, such as an adhesive and/or a cohesive. In one aspect of the present disclosure, the second compressible thermal material layer 78 may be attached to the second contact plate 72 and the cold plate 74 with a bonding material such as an adhesive and/or a cohesive. In one aspect of the present disclosure, the first and/or second thermal material layer 76, 78 may have self-adhesive properties on one or both sides.

In one aspect of the present disclosure, the first and second compressible thermal material layers 76, 78 each have a thickness of between approximately 0.002 and 1.15 inch.

In one aspect of the present disclosure, the first and second compressible thermal material layers 76, 78 have a thickness of between approximately 0.02 inch and 0.4 inch.

In one aspect of the present disclosure, the first and second compressible thermal material layers 76, 78 may be in the form of a pad, a gel, a spring, or any other compressible material with sufficient thermal transfer properties to transfer heat from the first and second contact plates 70, 72 to the cold plate 74. The first and second compressible thermal material layers 76, 78 have higher heat conductivity than air and help to fill any gaps between components, so as to increase thermal conductivity and lower thermal resistance between components. In one aspect of the present disclosure, the thermal conductivity of the first and second compressible thermal material layers 76, 78 may be between approximately 1.5 W/m*K and 5 W/m*K.

In one aspect of the present disclosure, the first and second compressible thermal material layers 76, 78 have a thermal conductivity of approximately 1.8 W/m*K.

The first and second compressible thermal material layers 76, 78 may be made of a commercially available product, such as Bergquist thermal material products provided by Henkel Electronics Materials, LLC, of Chanhassen, Minn., or compressible thermal gap fillers provided by Laird, of Earth City, Mo.

As shown in FIGS. 1-7, by way of example, the stacked cage optical module heat relay system 10 may have a first heat pipe 18-1 and a second heat pipe 18-2. Two heat pipes 18 are shown for explanatory purposes, but it will be understood that the stacked cage optical module heat relay system may have one heat pipe 18 or more than two heat pipes 18, as long as each cold plate 74 is in thermal contact with at least one heat pipe 18.

In the exemplary stacked cage optical module heat relay system in the figures, the first heat pipe 18-1 has a first portion 100 in thermal contact with the cold plates 74 of the first and second heat collector modules 14-1, 14-2 and a second portion 102 extending from the cold plates 74 an amount sufficient to also extend beyond the back 24 of the cage 12. The second heat pipe 18-2 has a first portion 104 in thermal contact with the cold plates 74 of the second and third heat collector modules 14-2, 14-3 and a second portion 106 extending from the cold plates 74 an amount sufficient to also extend beyond the back 24 of the cage 12.

It will be understood that the second portions 102, 106 of the first and second heat pipes 18-1, 18-2, may extend in other directions beyond the cage 12, where there is sufficient room for the first and second heat pipes 18-1, 18-2 and the radiator 16.

In one aspect of the present disclosure, the first portion 100 of the first heat pipe 18-1 is permanently connected, for example, soldered, to the cold plates 74 of the first and second heat collector modules 14-1, 14-2. In one aspect of the present disclosure, the first portion 104 of the second heat pipe 18-2 is permanently connected, for example, soldered, to the cold plates 74 of the second and third heat collector modules 14-2, 14-3.

As shown in FIG. 5, in one aspect of the present disclosure, the first portions 100, 104 of the heat pipes 18-1, 18-2 may extend partially a length of the cold plates 74. When the cold plates 74 are connected as a unit, the first portions 100, 104 of the heat pipes 18-1, 18-2 may extend into slots 109 in the cold plates 74.

Figure 7:
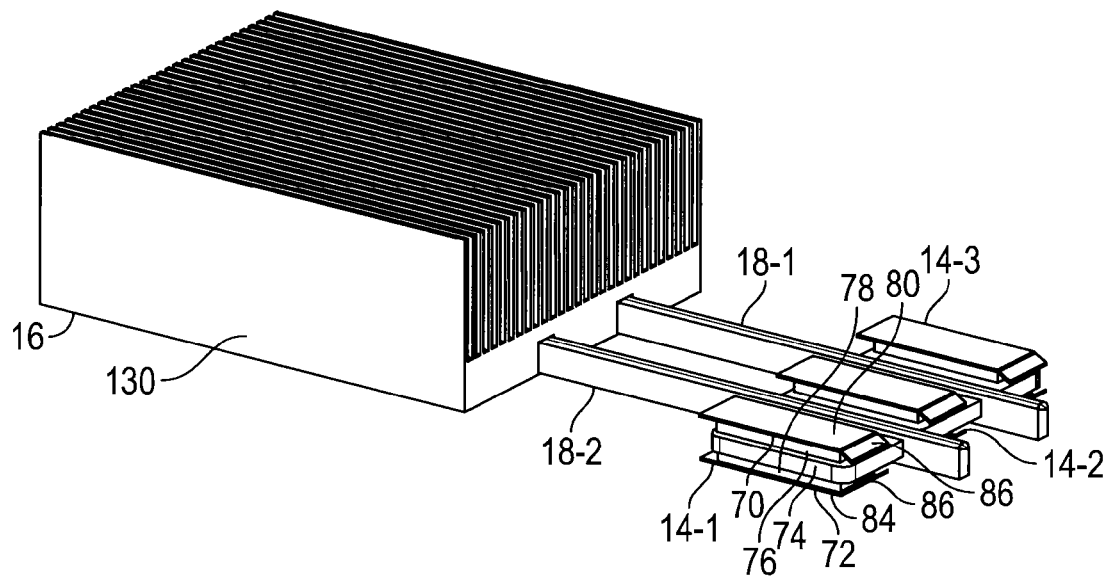
FIG. 7 is a perspective view of components of another embodiment of a heat collector module and a radiator constructed in accordance with the inventive concepts disclosed herein.

As shown in FIG. 7, in one aspect of the present disclosure, the first portions 100, 104 of the heat pipes 18-1, 18-2 may extend the length of the cold plates 74 and/or beyond the cold plates 74.

In one aspect of the present disclosure, the first portions 100 of the first and second heat pipes 18-1, 18-2 may be positioned in the openings 50 between the first and second ports 30, 32 of the bays 26 and/or in the bay openings 60 between the bays 26 and/or in the heat transfer opening 64 of the cage 12.

Figure 2:
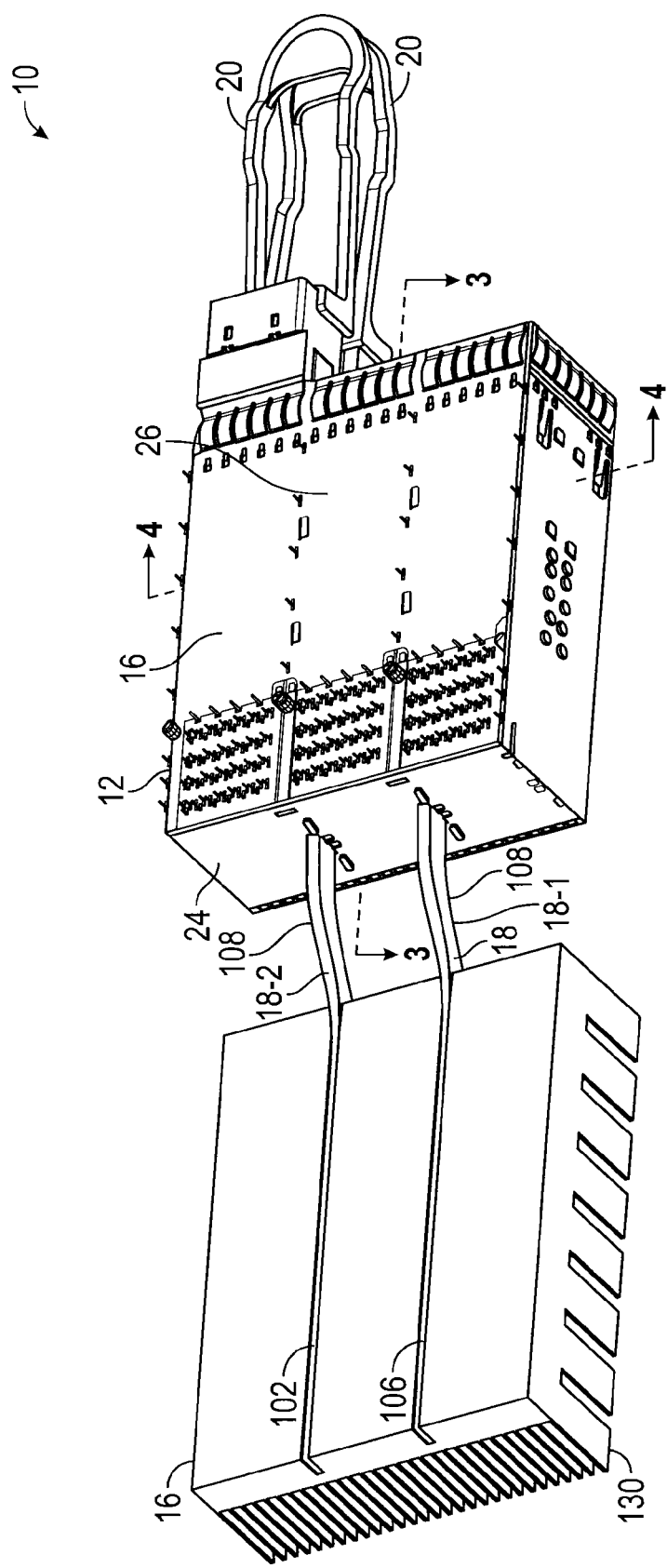
FIG. 2 is a rear bottom perspective view of a stacked cage optical module heat relay system and optical modules constructed in accordance with the inventive concepts disclosed herein.

As shown in FIG. 2, in one aspect of the present disclosure, the first and second heat pipes 18-1, 18-2 are shaped to fit between electrical connections (not shown) to the optical modules 20 that extend along the back 24 of the cage 12 to the circuit board (not shown).

In one aspect of the present disclosure, at least a portion of the first and second heat pipes 18-1, 18-2 has a substantially rectangular cross section. The first and second heat pipes 18-1, 18-2 may have a thickness of approximately two millimeters. The first and second heat pipes 18-1, 18-2 may be a four millimeter diameter heat pipe flattened to two millimeters.

The first and second heat pipes 18-1, 18-2 have a length sufficient such that the second portions 102, 106 of the first and second heat pipes 18-1, 18-2 are in thermal contact with the radiator 16. In one aspect of the present disclosure, the second portions 102, 106 of the first and/or second heat pipes 18-1, 18-2 extend into and/or along the length of the radiator 16. The length of the first and second heat pipes 18-1, 18-2 may be sized based at least in part on available area in an equipment cabinet (not shown). The length of the first and second heat pipes 18-1, 18-2 may also be sized based at least in part on the location of the radiator 16 for maximization of air flow around the radiator 16.

As shown in FIGS. 1-5, in one aspect of the present disclosure, the radiator 16 may be offset from the cage 12 and the first and second heat pipes 18-1, 18-2 may have a middle portion 108 that is angled or curved.

Figure 8:
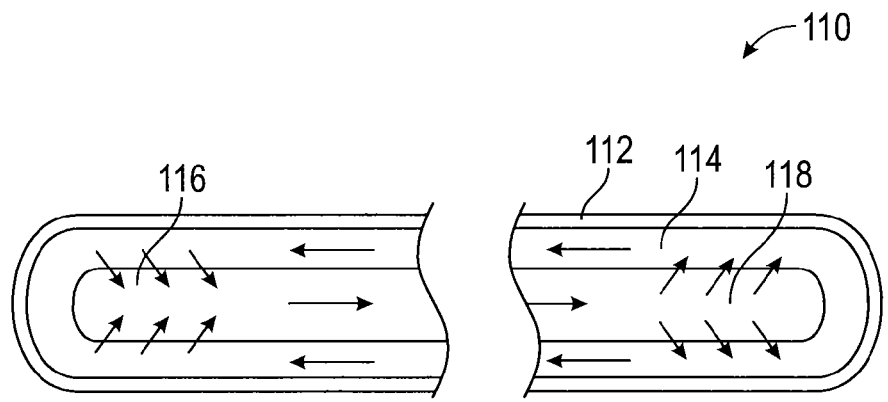
FIG. 8 is a schematic of an exemplary heat pipe used in accordance with the inventive concepts disclosed herein.

In one aspect of the present disclosure, the first and/or second heat pipes 18-1, 18-2 may be a fluid-wick type heat pipe 110. As illustrated in the schematic of FIG. 8, in one aspect of the present disclosure, the fluid-wick type heat pipe 110 may comprise an outer wall 112 made of a highly thermally conductive material (non-exclusive examples of which include copper or aluminum) surrounding a capillary wicking material 114 and a fluid 116. Non-exclusive examples of such fluid 116 include water, acetone, methanol, and the like. When the fluid 116 in the fluid-wick type heat pipe 110 absorbs heat, the fluid 116 evaporates to vapor 118. The vapor 118 moves along the interior of the fluid-wick type heat pipe 110 to a lower temperature portion of the fluid-wick type heat pipe 110, such as the portion of the fluid-wick type heat pipe 110 in thermal contact with the radiator 16. There the vapor 118 condenses back to fluid 116, releasing thermal energy, and the fluid 116 is absorbed by the wicking material 114. The fluid 116 then flows through the wicking material 114 back to the portion of the fluid-wick type heat pipe 110 that is a higher temperature, such as the first portion of the fluid-wick type heat pipe 110.

As shown in FIGS. 1, 2, and 7, the radiator 16 is positioned outside of the cage 12. The radiator 16 is sized and positioned dependent at least in part on available airflow and the amount of heat to be dispersed. In one non-exclusive example, the radiator may have a length of between approximately two and one half inches and three and one half inches, a width of between approximately two inches and three inches, and a height of between approximately three quarters of one inch and one inch.

The radiator 16 has a plurality of fins 130. The fins 130 may be orientated and designed in size and shape for front-to-back airflow, side-to-side air flow, or as pins for any direction airflow. For example, the fins 130 in the figures illustrate several possible configurations of the fins 130.

Additionally, the fins 130 are shown as extending in a first direction, but it will be understood that the fins 130 may extend and be orientated in any direction to maximize air flow around the fins 130 and/or to fit the radiator 16 in a cabinet, chassis, etc.

In one aspect of the present disclosure, the fins 130 may be orientated in vertical parallel rows. In one aspect of the present disclosure, the fins 130 may be orientated in horizontal parallel rows. In one aspect of the present disclosure, the fins 130 may be pin shaped.

The fins 130 may be made of aluminum, an aluminum blend, copper, graphite, or other thermally conductive material. In one aspect of the present disclosure, the thermal conductivity of the fins 130 may be at least 200 W/(m*K).

An example of use of the stacked cage optical module heat relay system 10 of FIGS. 1-7 will be described. However, it will be understood that elements of any aspects described in the disclosure in any number or combination may be used such that the stacked cage optical module heat relay system 10 may disperse heat from the optical modules 20 removably engaged in the cage 12.

In use, the bottom of the cage 12 typically is connected to a circuit board (not shown) and optical modules 20 are inserted into and removed from the first and second ports 30, 32 of the cage 12, thus connecting to the circuit board. As the optical modules 20 are used, the optical modules 20 produce heat.

In general, the stacked cage optical module heat relay system 10 transports heat from the optical modules 20 out of the cage 12 to the radiator 16, which can be sized to disperse the heat from the greatest possible number of optical modules 20 in the stacked cage optical module heat relay system 10 and which can be exposed to greater airflow outside of the cage 12 than the optical modules 20 in the cage 12. For example, the radiator 16 may be located in a designated corridor in an equipment room that is provided cooling airflow for dispersal of heat.

More particularly, when the first optical module 20-1 is removably engaged in the first port 30 of the bay 26 of the cage 12, the heat from the first optical module 20-1 is transferred from the first optical module 20-1 to the first contact plate 70 to the first compressible thermal material layer 76 to the cold plate 74. Additionally, when the second optical module 20-2 is removably engaged in the second port 32 of the bay 26 of the cage 12, the heat from the second optical module 20-2 is transferred from the second optical module 20-2 to the second contact plate 72 to the second compressible thermal material layer 78 to the cold plate 74.

In one aspect of the present disclosure, in use, the first contact plate 70 and/or the second contact plate 72 are contacting a side of the first and second optical modules 20-1, 20-2 that has the most heat comparative to other sides of the first and second optical modules 20-1, 20-2.

The heat is then transferred from the cold plate 74 to the first portion 100, 104 of the first heat pipe 18-1 and/or second heat pipe 18-2, through the first heat pipe 18-1 and/or second heat pipe 18-2 to the second portion 102, 106 of the first heat pipe 18-1 and/or second heat pipe 18-2. Then the heat is transferred from the second portion 102, 106 of the first heat pipe 18-1 and/or second heat pipe 18-2 to the radiator 16, where it is dispersed to the air around the fins 130 of the radiator 16.

Thus, the stacked cage optical module heat relay system 10 cools the optical modules 20 (including high-powered optical modules) matingly engaged in the stacked and ganged cage 12.

The stacked cage optical module heat relay systems 10 described above are of an exemplary size. It will be understood that the stacked cage optical module heat relay systems 10 may contain any sized stacked cage 12 and fit any size optical module 20.

CONCLUSION

Conventionally, telecommunication module cages have had poor heat dispersal methods for heat produced by optical modules 20. As power and heat dispersal requirements have increased, heat dispersal systems are needed to prevent drops in performance and failures of the optical modules 20. In one aspect of the present disclosure, stacked cage optical module heat relay systems 10 are configured to transfer heat from telecommunication optical modules 20 in a stacked cage 12 for dispersal outside of the stacked cage 12.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of optical modules, this need not be the case. These implementations may apply to supporting any type of electronic and/or optical equipment within a stacked housing, such as computer servers, power supplies, communication equipment or the like.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. An apparatus, comprising:
a cage having a front and a back, and a bay comprising a first port stacked with a second port, the bay having an opening between the first port and the second port, the first port having a first port bottom and the second port having a second port top;
a heat collector module positioned in the opening, the heat collector module comprising:
a first contact plate adjacent to the first port bottom and provided in the first port, the first contact plate being configured to contact an exterior of a first optical module pluggable in the first port;
a second contact plate adjacent to the second port top and provided in the second port, the second contact plate being configured to contact an exterior of a second optical module insertable in the second port;
a cold plate in between the first contact plate and the second contact plate, the cold plate comprising thermally conductive material, the first and second contact plates being formed of a single piece of material that is shaped to wrap around a front edge of the cold plate;
a first compressible thermal material layer in between and in contact with the first contact plate and the cold plate; and
a second compressible thermal material layer in between and in contact with the cold plate and the second contact plate;
a heat pipe having a rectangular cross section, a first portion of the heat pipe being in thermal contact with the cold plate, and a second portion of the heat pipe extending beyond the cage; and
a radiator in thermal contact with the second portion of the heat pipe.

2. The apparatus of claim 1, wherein the second portion of the heat pipe extends beyond the back of the cage.

3. The apparatus of claim 1, further comprising a pluggable optical module matingly engaged in the first port such that the exterior of the pluggable optical module is in thermal contact with the first contact plate.

4. The apparatus of claim 3, wherein the pluggable optical module is one of a SFP module, a SFP+ module, a QSFP module, and a QSFP+ module.

5. The apparatus of claim 1, further comprising a pluggable optical module matingly engaged in the second port such that the exterior of the pluggable optical module is in thermal contact with the second contact plate.

6. The apparatus of claim 5, wherein the pluggable optical module is one of a SFP module, a SFP+ module, a QSFP module, and a QSFP+ module.

7. The apparatus of claim 1, wherein the heat pipe is approximately 2 mm wide.

8. The apparatus of claim 1, wherein the heat pipe is a closed system containing fluid with an outer wall made at least partially of copper.

9. The apparatus of claim 1, wherein the radiator has heat dispersal fins orientated in vertical parallel rows.

10. The apparatus of claim 1, wherein the radiator has heat dispersal fins orientated in horizontal parallel rows.

11. The apparatus of claim 1, wherein the radiator is offset from the cage.

12. The apparatus of claim 1, wherein the bay of the cage is a first bay, the opening is a first opening, and the cold plate of the heat collector module is a first cold plate;
wherein the cage further comprises a second bay adjacent to the first bay, the second bay comprising a third port stacked with a fourth port, the second bay having a second opening between the third port and the fourth port, the third port having a third port bottom and the fourth port having a fourth port top;
wherein the heat collector module is positioned in the first opening and the second opening and further comprises:
a third contact plate adjacent to the third port bottom and provided in the third port, the third contact plate being configured to contact an exterior of a third optical module pluggable in the third port;
a fourth contact plate adjacent to the fourth port top and provided in the fourth port, the fourth contact plate being configured to contact an exterior of a fourth optical module insertable in the fourth port;

a second cold plate in between the third contact plate and the fourth contact plate, the second cold plate comprising thermally conductive material;

a third compressible thermal material layer in between and in contact with the third contact plate and the second cold plate; and a fourth compressible thermal material layer in between and in contact with the second cold plate and the fourth contact plate; and wherein the first portion of the heat pipe is in contact with the second cold plate.

13. The apparatus of claim 12, wherein the first cold plate and the second cold plate are connected.

14. The apparatus of claim 12, wherein the heat pipe is a first heat pipe, and further comprising:

a second heat pipe having a rectangular cross section, a first portion in thermal contact with the second cold plate, and a second portion extending beyond the cage and in thermal contact with the radiator.

15. The apparatus of claim 14, wherein the cage further comprises a third bay adjacent to the second bay, the third bay comprising a fifth port stacked with a sixth port, the third bay having a third opening between the fifth port and the sixth port, the fifth port having a fifth port bottom and the sixth port having a sixth port top, wherein the heat collector module is positioned in the first opening, the second opening, and the third opening;

wherein the heat collector module further comprises:

a fifth contact plate adjacent to the fifth port bottom and provided in the fifth port, the fifth contact plate being configured to contact an exterior of a fifth optical module pluggable in the fifth port;

a sixth contact plate adjacent to the sixth port top and provided in the sixth port, the sixth contact plate being configured to contact an exterior of a sixth optical module insertable in the sixth port;

a third cold plate in between the fifth contact plate and the sixth contact plate, the third cold plate comprising thermally conductive material;

a fifth compressible thermal material layer in between and in contact with the fifth contact plate and the third cold plate; and a sixth compressible thermal material layer in between and in contact with the third cold plate and the sixth contact plate; and wherein the first portion of the second heat pipe is in contact with the third cold plate.

16. The apparatus of claim 15, wherein the first cold plate, the second cold plate, and the third cold plate are connected, and wherein the first opening, the second opening, and the third opening are contiguous.

17. An apparatus, comprising:

a cage having a front and a back, and a plurality of bays, each bay comprising a first port stacked with a second port, each bay having an opening between the first port and the second port, the first port having a first port bottom and the second port having a second port top;

a heat collector module positioned in each opening, each heat collector module comprising:

a first contact plate adjacent to the first port bottom and provided in the first port, the first contact plate being configured to contact an exterior of a first optical module pluggable in the first port;

a second contact plate adjacent to the second port top and provided in the second port, the second contact plate being configured to contact an exterior of a second optical module insertable in the second port;

a cold plate in between the first contact plate and the second contact plate, the cold plate comprising thermally conductive material, the first and second contact plates being formed of a single piece of material that is shaped to wrap around a front edge of the cold plate;

a first compressible thermal material layer in between and in contact with the first contact plate and the cold plate; and a second compressible thermal material layer in between and in contact with the cold plate and the second contact plate;

a plurality of heat pipes each having a rectangular cross section, a first portion of each of the heat pipes being in thermal contact with at least one cold plate, and a second portion of each of the heat pipes extending beyond the cage; and a radiator in thermal contact with the second portions of the heat pipes.

* * * * *